(12) United States Patent
Brosig et al.

(10) Patent No.: US 7,656,056 B2
(45) Date of Patent: Feb. 2, 2010

(54) METHOD AND DEVICE FOR STABILIZING AN ON-BOARD ELECTRICAL SYSTEM OF A VEHICLE ELECTRICAL SYSTEM

(75) Inventors: Stefan Brosig, Hunkensbittel (DE); Holger Manz, Sickte (DE); Nikolaus Wahnschaffe, Wolfsburg/Hattorf (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/488,078

(22) PCT Filed: Aug. 28, 2002

(86) PCT No.: PCT/EP02/09606

§ 371 (c)(1),
(2), (4) Date: Jul. 23, 2004

(87) PCT Pub. No.: WO03/020556

PCT Pub. Date: Mar. 13, 2003

(65) Prior Publication Data

US 2004/0239184 A1 Dec. 2, 2004

(30) Foreign Application Priority Data

Aug. 30, 2001 (DE) ................. 101 42 086

(51) Int. Cl.
*B60L 1/00* (2006.01)
*B60L 3/00* (2006.01)
*H02J 7/34* (2006.01)
*H02J 1/10* (2006.01)
*H02J 9/00* (2006.01)
*H02J 1/16* (2006.01)

(52) U.S. Cl. .............. 307/10.1; 307/44; 307/59; 307/64; 307/65; 307/66; 307/67; 307/68

(58) Field of Classification Search ............... 307/10.1, 307/59, 44, 64, 65, 66, 67, 68
See application file for complete search history.

(56) References Cited

U.S. PATENT DOCUMENTS

| | | | |
|---|---|---|---|
| 3,629,704 A * | 12/1971 | Stevens ..................... 324/98 |
| 4,313,402 A * | 2/1982 | Lehnhoff et al. ......... 123/41.12 |
| 4,639,609 A * | 1/1987 | Floyd et al. ................ 307/10.1 |
| 5,416,702 A | 5/1995 | Kitagawa et al. |
| 6,201,310 B1 | 3/2001 | Adachi et al. |
| 6,222,341 B1 * | 4/2001 | Dougherty et al. .......... 320/104 |
| 6,378,636 B1 * | 4/2002 | Worrel ...................... 180/65.2 |

(Continued)

FOREIGN PATENT DOCUMENTS

DE 41 10 495 10/1992

(Continued)

*Primary Examiner*—Fritz M Fleming
*Assistant Examiner*—Dru M Parries
(74) *Attorney, Agent, or Firm*—Kenyon & Kenyon LLP

(57) ABSTRACT

A vehicle electrical system includes at least one battery, at least one fan and a device for detecting a critical state in the vehicle electrical system. The fan is activated when a critical state of the vehicle electrical system is detected. In this context, use is made of the fan's ability to store mechanical energy in the form of inertias. The fan operates in a regenerative manner and electrically feeds the mechanically stored energy back into the on-board electrical system.

34 Claims, 1 Drawing Sheet

U.S. PATENT DOCUMENTS

| | | |
|---|---|---|
| 6,454,033 B1 * | 9/2002 | Nathan et al. .............. 180/65.1 |
| 2002/0043946 A1 | 4/2002 | Yoshimura |
| 2002/0079092 A1 * | 6/2002 | Shembekar et al. ......... 165/152 |
| 2002/0109952 A1 * | 8/2002 | Rapsinski et al. ............. 361/86 |

FOREIGN PATENT DOCUMENTS

| | | |
|---|---|---|
| JP | 4-347536 | 12/1992 |
| JP | 5-217588 | 8/1993 |
| JP | 2000295827 | 10/2000 |
| JP | 2002-61512 | 2/2002 |

* cited by examiner

METHOD AND DEVICE FOR STABILIZING AN ON-BOARD ELECTRICAL SYSTEM OF A VEHICLE ELECTRICAL SYSTEM

FIELD OF THE INVENTION

The present invention relates to a method and a device for stabilizing an on-board electrical system of a motor vehicle electrical system.

BACKGROUND INFORMATION

The number of electrical loads continues to increase in modern motor vehicles. The use of safety-relevant loads is increasing as well, so that it must be ensured by suitable measures that sufficient electrical energy is available at all times. To this end, various measures have been proposed. For instance, it is conventional to switch off comfort loads in a stepped manner when the vehicle electrical voltages are low. Furthermore, it is conventional to situate individual loads in galvanically decoupled partial on-board electrical systems and to assign additional energy stores to these in the form of emergency batteries or capacitors, so that the operation of these loads is ensured even when the vehicle electrical system malfunctions or encounters a rapid voltage drop. Disadvantageous in these conventional measures is that they are very complex and expensive.

Therefore, an aspect of the present invention is based on the technical problem of providing a method and a device by which a rapid drop in the vehicle electrical system may be prevented in a less complicated manner.

SUMMARY

The vehicle electrical system of an exemplary embodiment of the present invention includes at least one battery, at least one fan and a device for detecting a critical state in the vehicle electrical system, the fan being activated when a critical state of the vehicle electrical system is detected. In this context, use is made of the fan's ability to store mechanical energy in the form of inertias. If the on-board electrical-system voltage subsequently drops, the supply voltage of the fan is lower than required for the instantaneous rotational speed, which is still maintained, however, due to the inertia of mass. Consequently, the fan induces a voltage that counteracts the voltage dip. The fan thus operates in a regenerative manner and electrically feeds the mechanically stored energy back into the on-board electrical system. Furthermore, due to the inertia, voltage spikes may be smoothed or prevented by the low-pass characteristic of the fan. An exemplary embodiment of the present invention may make it possible to dispense with additional components such as capacitors, for instance. It should be mentioned in this context that, instead of a fan, other loads having a rotating mass and being driven by a motor are able to be utilized as well.

In an exemplary embodiment of the present invention, the fan is run up as a function of the detected critical state of the vehicle electrical system, thereby increasing the energy that is able to be fed back.

In an exemplary embodiment of the present invention, the functionality of the battery is examined with the aid of the device for detecting the critical state of the vehicle electrical system. Further, the ripple content of the on-board electrical voltage may be checked. In this manner, given a battery that is no longer available due to a torn battery cable, for example, it may be ensured that a dynamic energy supply is available, which a generator may be unable to provide. In this context, the realization is utilized that, in the case of a battery being disconnected, the generator usually continues to supply sufficient voltage, so that the missing battery may not be detectable by a simple voltage comparison of the on-board electrical voltage to a setpoint value. If a heavy load is then switched on, a voltage dip results as a result of the inertia of the generator. However, since the fan has already been activated beforehand, the generator is already run up and its additional energy stored temporarily in the fan.

In an exemplary embodiment of the present invention, comfort loads are switched off in addition so as to reduce the load on the vehicle electrical system.

The combustion-engine cooling fan may be activated since it has a high fan output combined with large dimensions, and thus, inertias, via which electric currents in the range of 30 to 40 A are able to be fed back into the vehicle electrical system. Theoretically, other installed fans, such as the passenger-compartment fan, may be used as well, either by themselves or in addition.

DETAILED DESCRIPTION

Figure 1:
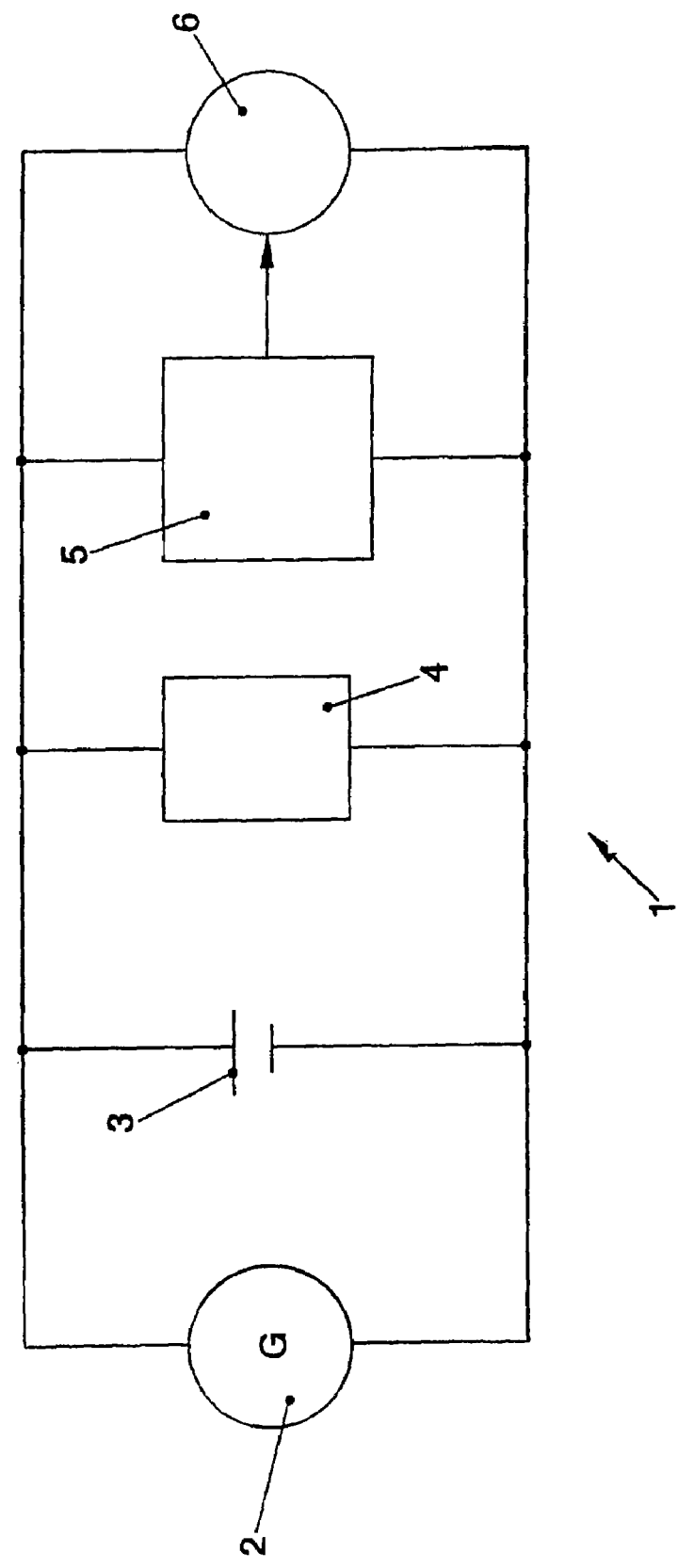
FIG. 1 is a schematic block diagram of an exemplary embodiment of the present invention for stabilizing the on-board electrical system of a vehicle electrical system.

Motor vehicle electrical system 1 includes a generator 2, a battery 3, electrical system loads 4, a device 5 for detecting a critical state of the vehicle electrical system and a fan 6. Device 5 is connected to fan 6, either directly or via a control device controlling fan 6.

In the normal state, generator 2 supplies sufficient energy for all loads 4 of the vehicle electrical system, battery 3 smoothing the pulsating generator voltage and acting as buffer for short-term voltage spikes. If the energy requirement increases, generator 2 is readjusted. This readjustment of the generator output voltage requires a certain time during which battery 3 acts as buffer. However, if battery 3 is defective or is unavailable for other reasons, the switching-in of a high-current load may result in a sudden dip in the on-board electrical voltage. In this connection, device 5 for detecting a state that is critical to the vehicle electrical system ascertains the on-board electrical voltage and, when detecting a critical state of the on-board electrical system, activates fan 6 before a high-current load is activated. For this purpose, device 5 analyzes the ripple of the vehicle electrical voltage, for instance, and turns on fan 6 when the vehicle system voltage has a certain ripple content. The fan motor then rotates at a rotational speed that corresponds to the vehicle electrical voltage. The electrical energy required by fan 6 is supplied by generator 2 whose energization must be increased accordingly.

If a high-current load is then switched in, the vehicle electrical voltage, and thus the voltage at fan 6, drops rapidly. However, due to the inertia, fan 6 continues rotating, namely at a rotational speed that is higher than that predefined by the actually given feed voltage. As a result, fan 6 then acts as generator and during the deceleration procedure supplies the energy stored in the form of kinetic energy into the on-board electrical system as electrical energy. That means that fan 6 is decelerated in a regenerative manner, the supplied electrical energy counteracting the cause of the deceleration, namely the voltage dip. This electrical energy additionally fed into the vehicle electrical system by fan 6, is then available to the high-current load, so that a deep voltage dip may be prevented. The combustion-engine fan, in particular, is predestined for this task since it has a high rate of power input and correspondingly large rotating masses, so that it is able to feed back between 30 to 40 A into the on-board electrical system on a short-term basis.

What is claimed is:

1. A method for stabilizing an on-board electrical system of a vehicle electrical system, including at least one battery, at least one rotational inertial load driven by an electric motor and a device configured to detect a state that is critical to the on-board electrical system, comprising:
   detecting a critical voltage state of the on-board electrical system by the device;
   in response to the detection of the critical voltage state and during the critical voltage state, driving the rotational inertial load by the electric motor such that the rotational inertial load stores rotational kinetic energy; and
   during the critical voltage state of the on-board electrical system and during a subsequent voltage drop of the on-board electrical system, driving the electric motor by the stored rotational kinetic energy of the rotational inertial load to generate electrical energy and supply the electrical energy to the on-board electrical system.

2. The method as recited in claim 1, further comprising running up the rotational inertial load as a function of the detected critical state of the on-board electrical system.

3. The method as recited in claim 1, further comprising checking a functionality of the battery by the device configured to detect a critical state of the on-board electrical system.

4. The method as recited in claim 1, further comprising analyzing a ripple content of an on-board electrical voltage.

5. The method as recited in claim 1, further comprising switching off comfort loads.

6. The method as recited in claim 1, wherein the rotational inertial load includes a fan.

7. The method as recited in claim 6, wherein the fan includes a combustion-engine fan.

8. A method of claim 1, wherein the critical voltage state of the on-board electrical system corresponds to a voltage of the on-board electrical system dropping below a threshold value.

9. The method according to claim 1, wherein the rotational inertial load driven by the electric motor stores the rotational kinetic energy and supplies the electrical energy to the on-board electrical system when a second high-current load is activated.

10. The method according to claim 1, wherein the rotational inertial load driven by the electric motor is activated before activating a second high-current load.

11. The method as recited in claim 1, wherein the critical voltage state of the on-board electrical system corresponds to a malfunction state of the on-board electrical system.

12. The method as recited in claim 1, wherein the critical voltage state of the on-board electrical system corresponds to a dropped voltage of the on-board electrical system.

13. The method as recited in claim 1, wherein the electrical system includes at least one generator driven by a combustion engine, the method further comprising, during the critical voltage state of the on-board electrical system and during the subsequent voltage drop, and simultaneously with the driving of the electric motor by the stored rotational kinetic energy of the inertial load, driving the generator by the combustion engine, the electric motor and the generator simultaneously generating electrical energy and supplying the electrical energy to the on-board electrical system.

14. The method as recited in claim 1, wherein the critical voltage state corresponds to at least one of (a) a defect in the battery, (b) a disconnection of the battery from the on-board electrical system, and (c) an unavailability of the battery to the on-board electrical system.

15. A device for stabilizing an on-board electrical system of a vehicle electrical system, comprising:
   at least one battery;
   at least one rotational inertial load driven by an electric motor in response to detection of a critical voltage state of the on-board electrical system and during the critical voltage state of the on-board electrical system to store rotational kinetic energy by the rotational inertial load; and
   a device configured to detect a critical voltage state of the on-board electrical system, the device configured to switch in, during the critical voltage state of the on-board electrical system during a subsequent voltage drop of the on-board electrical system, the rotational inertial load driven by the electric motor to drive the electrical motor by the stored rotational kinetic energy of the rotational inertial load to generate electrical energy and supply the electrical energy to the on board electrical system during a subsequent voltage drop of the on-board electrical system.

16. The device as recited in claim 15, wherein the rotational inertial load includes a fan.

17. The device as recited in claim 16, wherein the fan includes a combustion-engine fan.

18. The device as recited in claim 15, wherein the device configured to detect the critical voltage state of the on-board electrical system is configured to check a functionality of the battery.

19. The device as recited in claim 15, wherein the device is configured to detect and analyze a ripple content of an on-board electrical voltage.

20. The device according to claim 15, wherein the rotational inertial load driven by the electric motor stores rotational kinetic energy and supplies electrical energy to the on-board electrical system when a second high-current load is activated.

21. The device according to claim 15, wherein the device configured to detect the critical voltage state of the on-board electrical system is configured to switch in the rotational inertial load driven by the electric motor before activation of a second high-current load.

22. The device as recited in claim 15, wherein the critical voltage state of the on-board electrical system corresponds to a malfunction state of the on-board electrical system.

23. The device as recited in claim 15, wherein the critical voltage state of the on-board electrical system corresponds to a dropped voltage of the on-board electrical system.

24. A device for stabilizing an on-board electrical system of a vehicle electrical system, comprising:
   at least one battery;
   at least one rotational inertial load driven by an electric motor in response to detection of a critical voltage state of the on-board electrical system and during the critical voltage state of the on-board electrical system o store rotational kinetic energy by the rotational inertial load; and
   means for detecting a critical state of the on-board electrical system and for switching in, during the critical voltage state of the on-board electrical system and during a subsequent voltage drop of the on-board electrical system, the rotational inertial load driven by the electric motor to drive the electric motor by the stored rotational kinetic energy of the rotational inertial load to generate electrical energy and supply the electrical energy to the on-board electrical system during a subsequent voltage drop of the on-board electrical system.

25. The device according to claim 24, wherein the rotational inertial load driven by the electric motor stores rotational kinetic energy and supplies electrical energy to the on-board electrical system when a second high-current load is activated.

26. The device according to claim 24, wherein the means switches in the rotational inertial load driven by the electric motor before activation of a second high-current load.

27. The device as recited in claim 24, wherein the critical voltage state of the on-board electrical system corresponds to a malfunction state of the on-board electrical system.

28. The device as recited in claim 24, wherein the critical voltage state of the on-board electrical system corresponds to a dropped voltage of the on-board electrical system.

29. A method for stabilizing an on-board electrical system of a vehicle electrical system, comprising:
    detecting a critical voltage state of the on-board electrical system;
    in response to the detection of the critical voltage state and during the critical voltage state, driving a rotational inertial load by an electric motor, the rotational inertial load driven at a rotational speed based on a vehicle electrical voltage, rotation of the rotational inertial load storing rotational kinetic energy;
    generating electrical energy by continued rotation of the rotational inertial load due to the stored rotational kinetic energy after a voltage drop in the on-board electrical system and during the critical voltage state of the on-board electrical system; and
    supplying the electrical energy generated in the generating step to the on-board electrical system during the critical voltage state of the on-board electrical system.

30. The method as recited in claim 29, wherein the critical voltage state of the on-board electrical system corresponds to a malfunction state of the on-board electrical system.

31. The method as recited in claim 29, wherein the critical voltage state of the on-board electrical system corresponds to a dropped voltage of the on-board electrical system.

32. A method for stabilizing an on-board electrical system of a vehicle electrical system, including at least one battery, a generator, at least one electrical load having a rotating mass and drivable by an electrical motor, at least one high current load, and a device configured to detect a state that is critical for the on-board electrical system, comprising:
    detecting a critical state of the on-board electrical system;
    in response to the detection of the critical state and during the critical voltage state, activating the electrical load having the rotating mass by driving the electrical motor;
    during the critical state of the on-board electrical system, storing kinetic energy by the electrical load inducing back the stored energy as electrical energy to the electrical system if the high current load is switched on.

33. The method as recited in claim 32, wherein the voltage state of the on-board electrical system corresponds to a malfunction state of the on-board electrical system.

34. The method as recited in claim 32, wherein the voltage state of the on-board electrical system corresponds to a dropped voltage of the on-board electrical system.

* * * * *